US010533907B2

(12) United States Patent
Logan et al.

(10) Patent No.: US 10,533,907 B2
(45) Date of Patent: Jan. 14, 2020

(54) SYSTEM AND METHOD FOR MONITORING STRAIN IN ROADWAY OPTICAL CABLE

(71) Applicant: CORNING OPTICAL COMMUNICATIONS LLC, Hickory, NC (US)

(72) Inventors: Eric Raymond Logan, Hickory, NC (US); Allen Michael Miller, Lenoir, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/981,347

(22) Filed: May 16, 2018

(65) Prior Publication Data
US 2018/0266902 A1 Sep. 20, 2018

Related U.S. Application Data

(63) Continuation of application No. PCT/US2016/059040, filed on Oct. 27, 2016.
(Continued)

(51) Int. Cl.
*G01L 1/24* (2006.01)
*G01B 11/16* (2006.01)
(Continued)

(52) U.S. Cl.
CPC .............. *G01L 1/242* (2013.01); *G01B 11/16* (2013.01); *G01D 5/3537* (2013.01); *G01D 5/35345* (2013.01); *G01K 11/32* (2013.01)

(58) Field of Classification Search
CPC ... G01L 1/242; G01M 5/0091; G01M 11/086; G01D 5/353; G01D 3/028; G01D 5/35345; G01D 5/3537; G01K 11/32; G01B 11/16
See application file for complete search history.

(56) References Cited

U.S. PATENT DOCUMENTS 5,374,821 A * 12/1994 Muhs .................... G01B 11/18
250/227.16
5,399,854 A 3/1995 Dunphy et al.
(Continued)

FOREIGN PATENT DOCUMENTS

CN 201133811 Y 10/2008
CN 202083358 U 12/2011
(Continued)

OTHER PUBLICATIONS

European Patent Application No. 16866831.7 Office Action dated June 27, 2018; 7 Pages; European Patent Office.
(Continued)

*Primary Examiner* — Hina F Ayub
(74) *Attorney, Agent, or Firm* — William D. Doyle

(57) ABSTRACT

A system and method of delivering fiber optic communication service is provided. The method includes monitoring a strain signal generated by a strain-sensing optical fiber embedded in a roadway. The method includes comparing the strain signal to a predetermined allowable strain threshold of an optical communication cable associated with the strain-sensing optical fiber. The method includes relieving strain at a position along a length of the optical communications cable when the strain signal is determined to exceed the predetermined allowable strain threshold.

14 Claims, 5 Drawing Sheets

Related U.S. Application Data

(60) Provisional application No. 62/256,735, filed on Nov. 18, 2015.

(51) Int. Cl.
  *G01D 5/353* (2006.01)
  *G01K 11/32* (2006.01)

(56) References Cited

U.S. PATENT DOCUMENTS

| | | |
|---|---|---|
| 5,845,033 A | 12/1998 | Berthold et al. |
| 6,371,691 B1 | 4/2002 | Finzel et al. |
| 6,398,399 B1 | 6/2002 | Neophyton |
| 7,154,081 B1 | 12/2006 | Friedersdorf et al. |
| 8,205,669 B2 | 6/2012 | Martin et al. |
| 2002/0028034 A1 | 3/2002 | Chen et al. |
| 2003/0127587 A1 | 7/2003 | Udd et al. |
| 2008/0084914 A1 | 4/2008 | Yamamoto et al. |
| 2009/0127587 A1 | 5/2009 | Parris et al. |
| 2009/0248307 A1 | 10/2009 | Barrow et al. |
| 2012/0082422 A1 | 4/2012 | Sarchi et al. |
| 2013/0223807 A1 | 8/2013 | Elford et al. |
| 2014/0306574 A1* | 10/2014 | Twerdochlib ............ H02K 1/16 310/216.129 |
| 2014/0312215 A1 | 10/2014 | Smith et al. |
| 2014/0331779 A1 | 11/2014 | Hurley et al. |
| 2016/0209616 A1 | 7/2016 | Miller |
| 2017/0067794 A1* | 3/2017 | Matsuura ............ G01D 5/35364 |
| 2017/0276523 A1* | 9/2017 | Lally .................. G01D 5/35361 |

FOREIGN PATENT DOCUMENTS

| | | |
|---|---|---|
| JP | 2008203128 A | 9/2008 |
| WO | 2015136286 A2 | 9/2015 |

OTHER PUBLICATIONS

International Search Report and Written Opinion of the International Searching Authroity; PCT/US2016/59040; dated Jan. 13, 2017; 14 Pages; ISA/US Commissioner for Patents.

Moffat et al; "Estimating Tunnel Wall Displacements Using a Simple Sensor Based on a Brillouin Optical Time Domain Reflectometer Apparatus"; International Journal of Rock Mechanics and Mining Sciences, vol. 75, Apr. 2015, pp. 233-243.

Zamarreno et al; "Optical Sensors for Corrosion Monitoring"; Chapter 18; Intelligent Coatings for Corrosion Control; 2015; 38 Pages.

EP1686683.7 Extended Search Report dated Jun. 6, 2019, European Patent Office, 6 Pgs.

* cited by examiner

SYSTEM AND METHOD FOR MONITORING STRAIN IN ROADWAY OPTICAL CABLE

PRIORITY APPLICATIONS

This application is a continuation of International Application No. PCT/US16/59040, filed on Oct. 27, 2016, which claims the benefit of priority to U.S. Application Ser. No. 62/256,735, filed on Nov. 18, 2015, both applications being incorporated herein by reference.

BACKGROUND

The disclosure relates generally to a method and system for monitoring fiber optic cable strain and more particularly to roadway optical fiber cable strain. Strain within an optical fiber can be measured by measuring the change in a transmission property of a signal along the optical fiber (e.g., the Brillouin scattering of the fiber). The measured strain can be related to bulk strain experienced by the cable.

SUMMARY

One embodiment of the disclosure relates to a method of delivering fiber optic communication service. The method includes embedding a fiber optic cable within a channel formed within a roadway and embedding a strain-sensing optical fiber within the channel. The fiber optic cable includes a communications optical fiber extending a length of the channel. The method includes comparing the determined strain to a predetermined allowable strain threshold and locating a roadway defect along the fiber optic cable when the determined strain exceeds the predetermined allowable strain threshold. The method includes decreasing the strain experienced by the strain-sensing optical fiber and the fiber optic cable by modifying the roadway at the location of the roadway defect.

An additional embodiment of the disclosure relates to a method of monitoring a roadway embedded fiber optic cable. The method includes monitoring a strain signal generated by a strain-sensing optical fiber embedded in a roadway, comparing the strain signal to a predetermined allowable strain threshold of an optical communication cable associated with the strain-sensing optical fiber, and relieving strain at a position along a length of the optical communications cable when the strain signal is determined to exceed the predetermined allowable strain threshold.

An additional embodiment of the disclosure relates to a roadway based optical communication distribution system. The system includes a channel located beneath a surface of the roadway and an optical communication cable located within the channel. The channel extending along a portion of the roadway. The system includes a strain-sensing optical fiber located within the channel, and a strain monitor monitoring a strain signal generated by the strain-sensing optical fiber embedded in a roadway. The strain monitor compares the strain signal to a predetermined allowable strain threshold of the optical communication cable. The predetermined allowable strain threshold is less than a recoverable strain limit of the optical communication cable.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
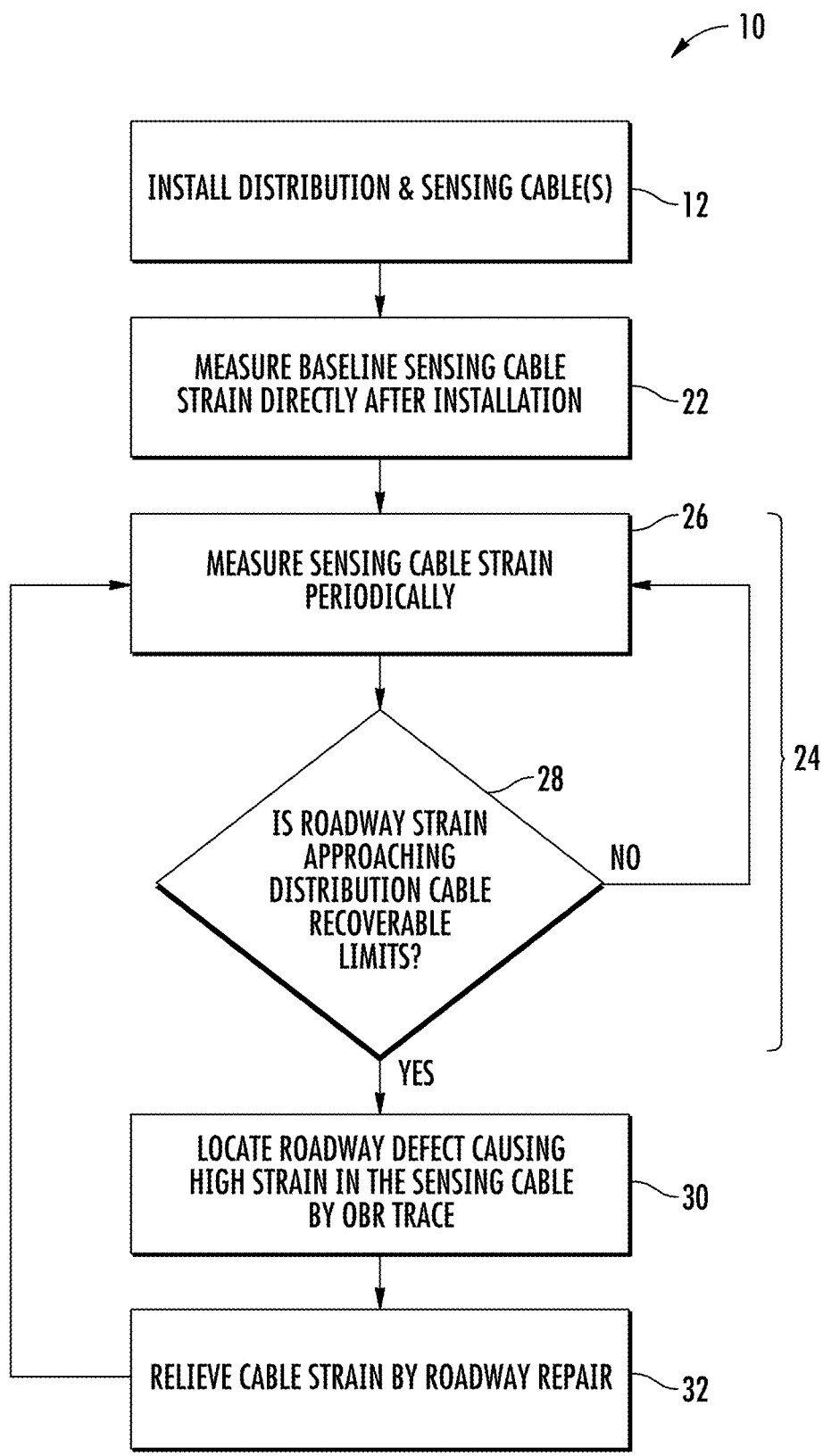
FIG. 1 shows a method of delivering fiber optic communication service including roadway cable strain monitoring according to an exemplary embodiment.

Referring generally to the figures, various embodiments of a method and system for monitoring strain within a roadway-embedded optical fiber cable is shown and described. In various embodiments, an optical fiber cable is located within a channel, trench, or groove formed in a roadway (e.g., within an asphalt or concrete roadway surface layer) or otherwise embedded in the roadway. A strain-sensing optical fiber (e.g., a strain-sensing fiber embedded within the jacket of the optical fiber cable) is also located within the channel. The strain experienced by the strain-sensing optical fiber is related to the strain experienced by the communication optical fibers of the optical cable. The strain experienced by the strain-sensing optical fiber is monitored to determine/identify when a predetermined allowable strain threshold is met or is being approached. The predetermined allowable strain threshold may be a strain parameter such as a strain level or a rate of strain change that indicates that the strain experienced by the cable is approaching a level at which cable repair or replacement will be needed.

In various embodiments, the strain may be caused by various roadway defects, including roadway cracks, buckling, horizontal shifting or separation, vertical shifting or separation, etc. When the predetermined allowable strain threshold is reached and prior to the strain exceeding the recoverable strain limit for the cable, steps may be taken at the site of the roadway defect to alleviate or reduce the strain experienced by the cable such that strain is reduced before the recoverable strain limit of the cable is exceeded. Thus, the method and system discussed herein addresses increasing strain within a roadway cable before cable replacement or bypass is needed. Thus, the system and method disclosed herein eliminates the need to access the embedded cable within a roadway channel following breakage and also allows the roadway cable strain to be addressed prior to loss of network connectivity that typically occurs following strain-based cable failure.

In various embodiments, through modeling and testing, Applicant has identified various degrees of roadway displacement for three common types of roadway defects (e.g., horizontal shearing, vertical shearing and crack separation) that may indicate that a cable is approaching its recoverable limit. By monitoring experienced cable strain in relation to the empirically determined displacement limits, roadway repairs can be undertaken prior to cable breakage.

Further, in various embodiments discussed herein, Applicant has identified efficient and simple strain relief methods that can be applied to relieve strain at the site of a roadway defect without the need to access the cable within the roadway and without the needed to repair the entire roadway defect that is causing the cable strain. In various embodiments, the strain relief steps may include cutting the road at the site of the defect, for example on each side of the channel, such that the strain experienced by the cable is eliminated/reduced. In such embodiments, by decoupling the roadway channel from the remaining portion of the roadway at the site of the defect, the channel and fiber optic cable are permitted to return to a low strain position even though the roadway defect remains.

Figure 2:
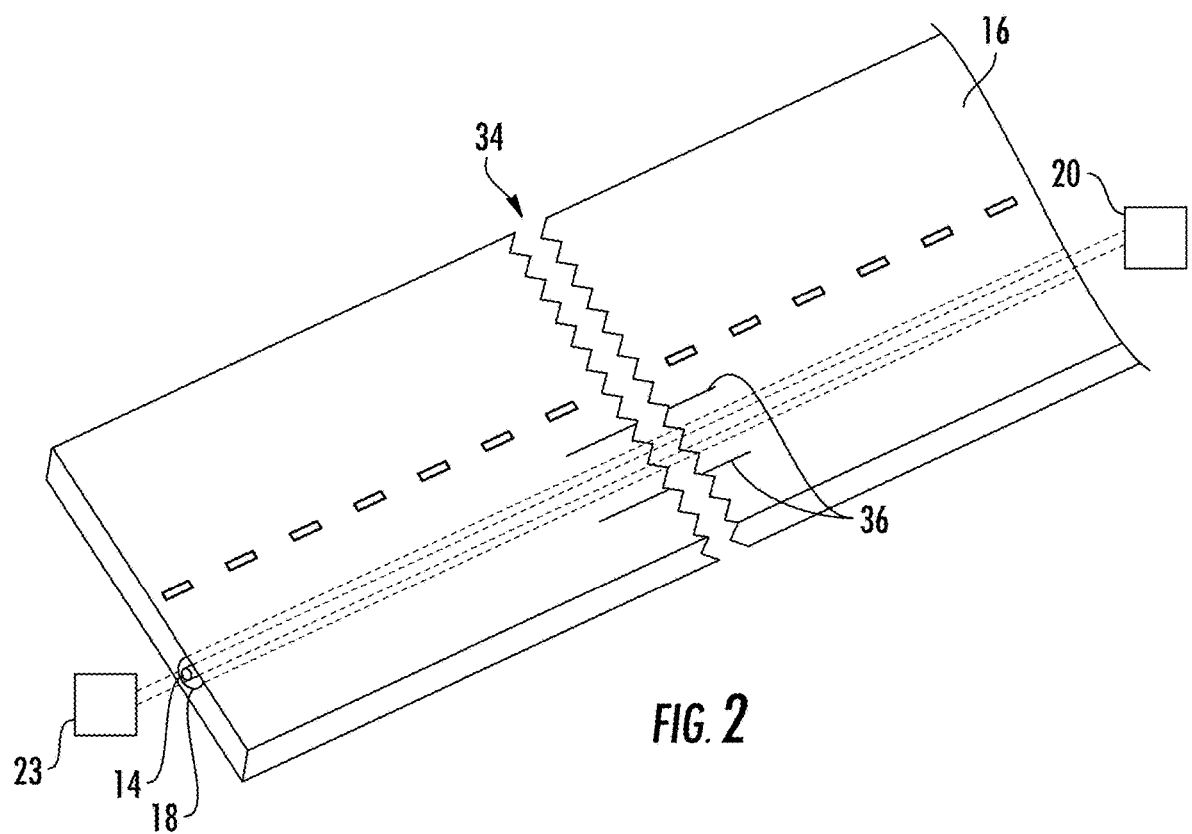
FIG. 2 shows a schematic view of a system for delivering fiber optic communication service including roadway cable strain monitoring according to an exemplary embodiment.

Referring to FIG. 1 and FIG. 2, a method of delivery fiber optic communication services 10 is shown according to an exemplary embodiment. As explained in more detail below, method 10 generally includes a process of monitoring strain experienced by a roadway-embedded optical fiber via a strain-sensing optical fiber associated with a fiber optic communication cable. When the measured strain indicates that strain is approaching a level that will damage the cable, the system operator may take steps to decrease the strain before permanent damage occurs to the cable and/or before a service outage occurs.

Referring to FIG. 1 and FIG. 2, at step 12, a fiber optic cable, shown as distribution cable 14, and a strain-sensing optical fiber (e.g., shown in FIGS. 3 and 4) are installed in a roadway 16, such as a concrete or asphalt roadway. In various embodiments, both distribution cable 14 and the associated strain-sensing optical fiber are embedded within or below the surface of roadway 16 within a channel 18. In general, in the embodiment shown, channel 18 extends lengthwise along roadway 16 and is located within the concrete or asphalt material of roadway 16. In other embodiments (such as for cables near property lines for a pair of households), channel 18 and cable 14 extend widthwise across roadway 16.

In some arrangements, channel 18 may be a relatively shallow and narrow groove formed in the roadway for receiving cable 14 and the associated strain-sensing optical fiber. In various embodiments, channel 18 may be less than three inches deep below the outer surface of roadway 16 and may be less than one inch wide. Utilizing optical cable 14 embedded within a roadway is a cost effective way of connecting neighborhoods and homes to a fiber optic network. In some embodiments, once cable 14 and the associated strain-sensing optical fiber are embedded within channel 18, a polymer material, such as a polyurea material, is deposited into the channel to fill the channel and surround cable 14. In some embodiments, the strain-sensing optical fiber may be an optical fiber located within the jacket of cable 14, and in other embodiments, the strain-sensing optical fiber may be a fiber of separate cable installed within channel 18.

As will be generally understood, cable 14 extends the length or substantially the length of channel 18 and acts to distribute a fiber optic network along roadway 16. For example, cable 14 extends the length or substantially the length of channel 18 in order to provide transmission of optical signals between devices at opposite ends of the network served by cable 14. In such embodiments, the strain-sensing optical fiber also extends along the length or substantially the length of channel 18. As shown schematically in FIG. 2, cable 14 and the related strain-sensing optical fiber are communicably coupled to a strain monitoring system 20. In addition, one or more network users 23 may receive communication services via cable 14.

In the embodiment of FIG. 1, at step 22, a baseline strain experienced by the strain-sensing fiber is measured soon after installation. In various embodiments, the baseline strain measurement is taken within 1 week and more specifically within 1 day after cable 14 and/or the related strain-sensing fiber are installed into channel 18. In various embodiments, the measured baseline strain may be used during straining monitoring to help ensure that the strain experienced by the strain-sensing fiber and/or communication cable 14 is being accurately measured.

As shown in FIG. 1, method 10 includes a process of monitoring the stress experienced by cable 14, shown as strain monitoring process 24. In specific embodiments, the strain experienced by cable 14 is monitored, calculated or estimated by monitoring the strain experienced by a strain-sensing optical fiber associated with cable 14. At step 26, the strain experienced by the strain-sensing optical fiber is determined/measured periodically. In various embodiments, strain is measured at least once a year, at least semiannually, at least quarterly, etc. In a specific embodiment, strain is measured once a year, and then as strain approaches the allowable maximum strain, strain measurement frequency is increased, for example to quarterly. In this embodiment, strain measurement returns to once per year following completion of the strain relief procedure.

In various embodiments, at step 26, a strain signal by the strain-sensing optical is received by a monitoring system, such as system 20. In various embodiments, the amount or degree of strain is determined or calculated from received strain signal. In various embodiments, the strain signal is a measured optical transmission property of an optical signal transmitted along the strain-sensing optical fiber, and in a specific embodiment, the strain signal is an optical transmission property measured using optical backscatter reflectometry.

In some embodiments, a temperature-sensing fiber is located within channel 18, and in specific embodiments, the temperature sensing fiber is located within the cable jacket of cable 14. In such embodiments, method 10 may include steps of determining temperature of the strain-sensing fiber by monitoring a temperature signal generated by the temperature sensing fiber. In such embodiments, step 26 includes determining strain based on both the determined temperature and the strain signal.

In specific embodiments, strain within the strain-sensing optical fiber is measured by transmitting a signal along the strain-sensing optical fiber and by measuring the change in a transmission property of the signal along the strain-sensing optical fiber. The change in certain transmission properties within an optical fiber can be correlated to strain within the fiber. However, both strain within the strain-sensing optical fiber and the temperature of the strain-sensing optical fiber can affect the detected transmission property. Thus, to determine the effect that the temperature of the strain-sensing optical fiber has on the transmission property, the signal is also transmitted along a temperature-sensing cable and the transmission property experienced by the signal along the length of the second optical fiber is measured.

Because the temperature-sensing optical fiber is isolated from strain and thus only experiences temperature of the cable, the measured change in transmission property along the temperature-sensing fiber indicates the temperature effect. With the effect of the temperature on the transmission property determined, the effect of strain on the transmission property measured from the strain-sensing fiber can be isolated and correlated with the strain present in the strain-sensing fiber. One particular transmission property that can be measured is the change of Brillouin scattering experienced by the signal along the length of the optical fibers. In specific embodiments, a Luna OBR 4600 is used for distributed strain sensing and temperature sensing is conducted using the Rayleigh spectral shift method.

In general, the strain monitoring process and system includes the steps of comparing the determined strain to a predetermined allowable strain threshold. In the particular embodiment shown in FIG. 1, the predetermined allowable strain threshold is a strain level close to but less than a maximum recoverable strain limit of cable 14. In various embodiments, the maximum recoverable strain limit is an upper strain limit at which cable 14 will return to the unstrained condition following relief of the strain. Further, the maximum recoverable strain limit is also less than the strain at which permanent damage, such as fiber breakage, within cable 14 will occur. Thus, as shown at step 28, by comparing the monitored strain to the maximum allowable strain threshold, a determination is made whether the measured strain is approaching the recovery limit of cable 14. As explained in more detail below, the recovery limits of a particular cable design may be determined empirically for various cable designs.

In other embodiments, the predetermined allowable strain threshold may be any other strain threshold related to the operation of a particular fiber optic network. For example, in other embodiments, the predetermined allowable strain threshold may be determined to be the level of strain at which signal attenuation within the network reaches a maximum acceptable signal attenuation level, even if that level is not approaching a physical limit of the cable. In a specific exemplary embodiment, the predetermined allowable strain threshold is the strain associated with a roadway displacement of less than 10 mm and an optical signal attenuation of less than or equal to 2 dB. As a specific example, in at least one test, Applicant has determined that a single 13 mm horizontal shear event in the network would cause at least 2 dB signal attenuation. As another specific example, Applicant has determined that approximately twenty 10 mm crack separation events in the network would cause at least 2 dB signal attenuation. In particular embodiments, the sum of all roadway induced losses in the network is less than or equal to the 2 dB budget. In at least some embodiments, it is projected that if distribution to the roadway fiber system is more efficient with less loss (as compared to standard optical networks), the 2 dB optical attenuation threshold may be increased utilizing the systems and methods discussed herein.

As shown in FIG. 1, if, at step 28, it is determined that the measured strain has not exceeded the predetermined allowable strain threshold (e.g., strain is not approaching the recoverable limit), the process returns to step 26, and the strain monitoring is continued periodically. If, at step 28, it is determined that predetermined allowable strain threshold is exceeded (e.g., strain is approaching the recoverable limit), various remediation steps may be taken to relieve or decrease the strain experienced by cable 14 and by the strain-sensing optical fiber.

In the specific embodiment of FIG. 1, at step 30, a roadway defect causing the high strain condition is located. In one embodiment, an optical backscatter reflectometry (OBR) trace is used to identify the location of the roadway defect. In specific embodiments, the OBR trace locates the peak strain with accuracy on the order of 10 centimeters. The OBR location is referenced from the end of the sensing cable from which the OBR measurement was taken. The peak strain location is found by measuring the strain cable path from the end of the sensing cable (using a measuring wheel or other device) until the field measurement equals the OBR trace location. A visible or otherwise detectable roadway defect will be present in the vicinity of the measured peak strain location.

At step 32, the strain experienced by the cable is decreased, relieved or eliminated by modifying the roadway and/or by repairing the roadway at the location of the defect. For example, as shown schematically in FIG. 2, a roadway defect 34 may impact cable 14. Roadway defect 34 may be a crack, a buckle, a horizontal shift, etc. across which cable 14 extends. Depending on the relative movement of the portions of the roadway on opposite sides of defect 34, cable 14 may experience horizontal shearing, vertical shearing and/or tensioning caused by crack separation generally in the length direction of the roadway. As will be understood, as the portion of roadway 16 surrounding cable 14 at defect 34 moves, strain is experienced by cable 14 at the portion of the cable spanning the detect.

Applicant has found that by identifying the location of defect 34, a corrective or repair action at step 32 may be performed to reduce or eliminate the increased strain. Such strain relief may be provided through relatively simple repair steps, and in at least some embodiments, full repair of defect 34 is not required. By undertaking the repair action before the recoverable strain limit of cable 14 is reached and before cable damage occurs, method 10 allows the high strain condition to be addressed before service to the network is interrupted and before a section of cable 14 needs to be replaced.

Strain caused by defect 34 may be addressed in a variety of suitable ways. In one embodiment, roadway 16 may be cut at locations 36 on both sides of channel 18 at the location of defect 34. In one embodiment, the cuts may be located on both sides of defect 34 and may extend in both directions away from and across defect 34. In general, the cuts separate the portion of roadway 16 surrounding cable 14 at defect 34 from the remaining portion of defect 34 thereby decreasing or eliminating the strain experienced by cable 14. In specific embodiments, the cuts at locations 36 may be relatively short, such as greater than 1 foot, or approximately 300 mm, and less than 10 feet, or approximately 3 meters, in length.

In various embodiments, additional repair or correction steps may be taken. For example, cuts at locations 36 may be filed or patched following strain relief with a polymeric material, such as polyurea. In such embodiments, the patch material provides a physical barrier between cars on the roadway and cable 14 and may also provide a seal, preventing water from entering channel 18. It should be noted that, in such embodiments, strain relief of cable 14 does not necessarily involve complete repair of defect 34.

Figure 3:
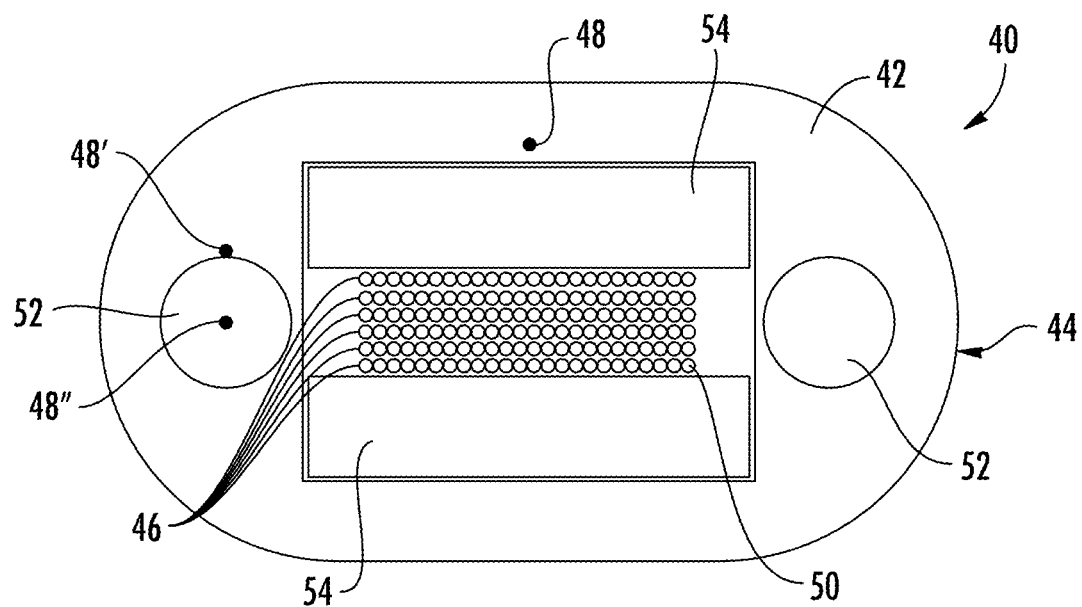
FIG. 3 shows a strain-sensing, roadway-embedded cable according to an exemplary embodiment.
Figure 4:
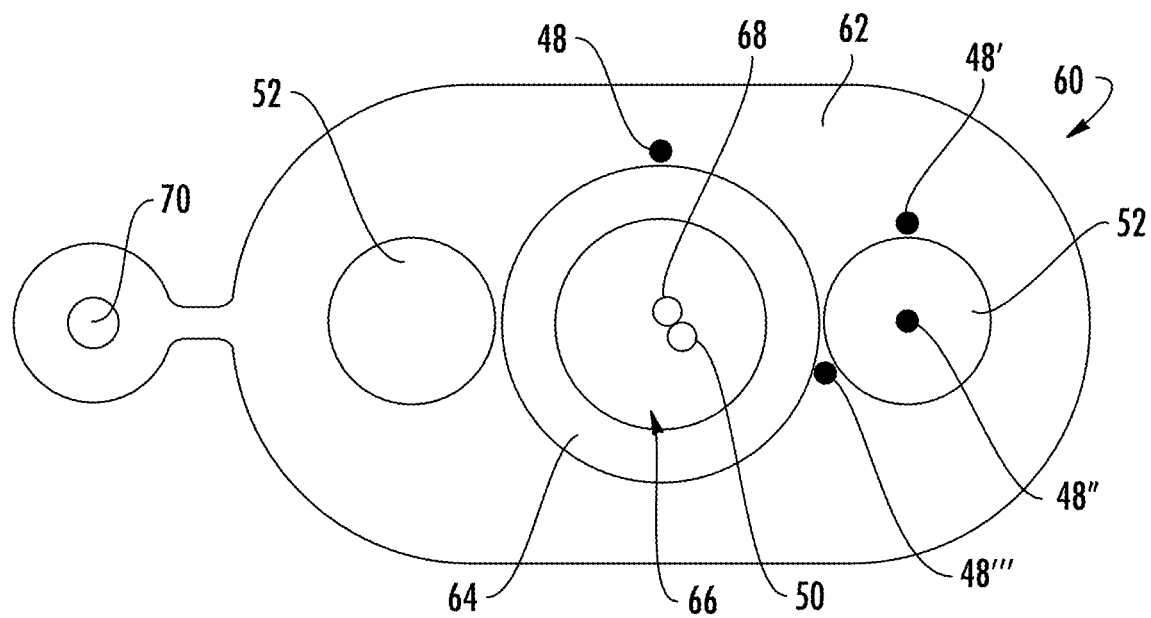
FIG. 4 shows a strain-sensing, roadway embedded cable according to another exemplary embodiment.

Referring to FIG. 3 and FIG. 4, two optical communication cables are shown according to exemplary embodiments. It should be understood that either of the cables shown in FIGS. 3 and 4 is an exemplary embodiment of cable 14 that may be used as a part of roadway deployed optical communications system.

Referring to FIG. 3, a cross-sectional view of strain-sensing cable 40 is shown according to an exemplary embodiment. Cable 40 includes a cable jacket, outer jacket or sheath, shown as jacket 42. Jacket 42 is an extruded material (e.g., an extruded polymer material) that supports the other components of cable 40. Jacket 42 is the outer layer of cable 40 and forms the outer sidewall or axially extending outer surface 44 of cable 40. When cable 40 is located within channel 18 formed in roadway 16 (as shown in FIG. 2), outer surface 44 is the surface of cable 40 that engages or interfaces with surface defining channel 18. The material of jacket 42 may be any material used in cable manufacturing, such as polyethylene, polyvinyl chloride (PVC), polyvinylidene difluoride (PVDF), nylon, polyester or polycarbonate and their copolymers.

Cable 40 includes at least one communication optical fiber, shown as optical fibers of optical fiber ribbons 46 located within a central channel or cavity formed within jacket 42. In addition, cable 40 includes at least one strain-sensing optical fiber, shown as strain-sensing optical fiber 48, coupled to jacket 42. As shown in FIG. 3, strain-sensing optical fiber 48 is located within jacket 42 and, specifically, is embedded within the material of jacket 42. In this embodiment, an outer surface of strain-sensing optical fiber 48 is in contact with and is coupled to the material of jacket 42 such that strain experienced by cable 40 is experienced by strain-sensing optical fiber 48. In various embodiments, optical fiber 48 extends between opposing ends of cable 40, and the length of optical fiber 48 is substantially the same as the length of cable 40. Thus, in this arrangement, as cable 40 experiences strain, strain-sensing optical fiber 48 also experiences strain.

In the embodiment shown, cable 40 also includes a temperature-sensing optical fiber 50, located within jacket 42, and specifically, temperature-sensing optical fiber 50 is one of the optical fibers of one of the optical fiber ribbons 46. In general, temperature-sensing optical fiber 50 is located within jacket 42 adjacent to and in close proximity to strain-sensing optical fiber 48 such that the temperature of fiber 50 is substantially the same e.g., within 1 degree C., within 2 degrees C., etc.) as the temperature of optical fiber 48. In contrast to fiber 48, temperature-sensing optical fiber 50 is configured and arranged within cable 40 such that fiber 50 is isolated from the strain applied to cable 40.

In exemplary embodiments, temperature-sensing optical fiber 50 and ribbons 46 are isolated from strain by having a length that is greater than the length of fiber 48, cable jacket 42 and strength members 52 (e.g., an excess fiber length, EFL, excess ribbon length, ERL, etc.). Specifically, ribbons 46 and temperature-sensing optical fiber 50 extend between opposing ends of cable 40. However, the axial length of ribbons 46 and temperature-sensing optical fiber 50 is greater than the axial length of fiber 48, such that as strain is applied to cable 40, the extra length of ribbons 46 and of fiber 50 extends or straightens within jacket 42. In this arrangement, ribbons 46 and fiber 50 extend instead of experiencing the strain, but because fiber 48 is the same length as cable 40, fiber 48 experiences the strain applied to cable 40. Thus, the temperature signal determined from fiber 50 may be used to accurately determine strain applied to fiber 48 by allowing the strain measurement to be adjusted to account for the temperature effect, as discussed above. Further, fiber 48 generates strain signals representing the cable strain before the fibers of ribbons 46 actually experience the strain. In this way, the strain experienced by fiber 48 provides an indication of or is related to (specifically is more than) the strain experienced by ribbons 46 and temperature-sensing fiber 50.

In various embodiments, cable 40 may include one or more elongate strength members 52. In general, strength members 52 act to provide structural support to cable 40, and specifically provide increased axial strength to cable 40. In the embodiment shown, strengthening members 52 are elongate, generally cylindrical or rod-like members embedded within the material of jacket 42. In these embodiments, strengthening members 52 have outer surfaces that are coupled to the material of jacket 42. Strengthening members 52 may generally be formed from a rigid material, more rigid than the material of outer jacket 42, and in various embodiments, strengthening members 52 may be metal, braided steel, glass-reinforced plastic, fiber glass, fiber glass yarns or other suitable material. In addition, cable 40 may include one or more layers of water blocking tape material 54 located within jacket 42.

In various embodiments, strain-sensing fiber 48 may be located in a variety of locations such that fiber 48 experiences the strain experienced by cable 40. As one example, fiber 48 may be located along the outer surface of one of the strength members 52, shown as fiber 48'. As another example, fiber 48 may be located within one of the strength members 52, shown as fiber 48". In either position, the strain sensed by fiber 48 is proportional to or the same as the strain experienced by cable 40, and is related to (e.g., more than) the strain experienced by ribbons 46 and/or temperature-sensing fiber 50.

Referring to FIG. 4, a strain-sensing cable 60 is shown according to an exemplary embodiment. Cable 60 is substantially the same as cable 40 except as discussed herein. Cable 60 includes an outer jacket 62 in which the components of cable 60 are supported and embedded. Cable 60 includes a buffer tube 64 surrounded by jacket 62. Generally, buffer tube 64 is a polymeric (e.g., thermoplastic) tube that defines a cavity or lumen 66, and at least one communication optical fiber 68 is located within lumen 66. In the embodiment, temperature-sensing optical fiber 50 is also located within lumen 66. Similar to ribbons 46 discussed above, communication optical fiber 68 may be strain isolated by having a longer length than that of tube 64, jacket 62 or strength members 52.

Cable 60 also includes a third alternative location of strain-sensing fiber 48, shown as fiber 48''', located between an outer surface of tube 64 and one of the strength members 52. In addition, cable 60 may include a toning wire 70. As will generally be understood, toning wire 70 is an electrical conductor that may be activated to generate a signal that facilitates the location or tracing of cable 60 when installed within channel 18, as shown in FIG. 2.

Figure 5:
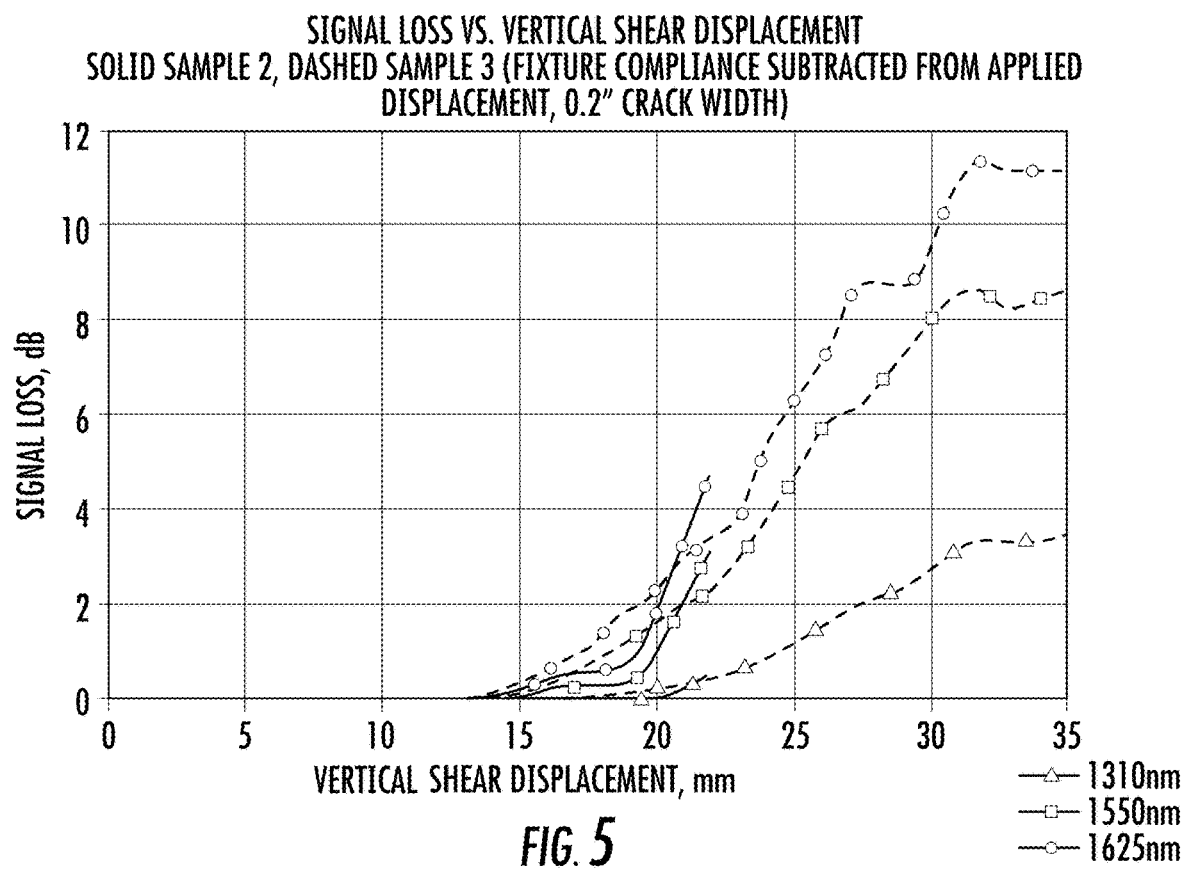
FIG. 5 shows a plot of signal loss vs. vertical displacement generated from several vertical shear simulation tests.
Figure 6:
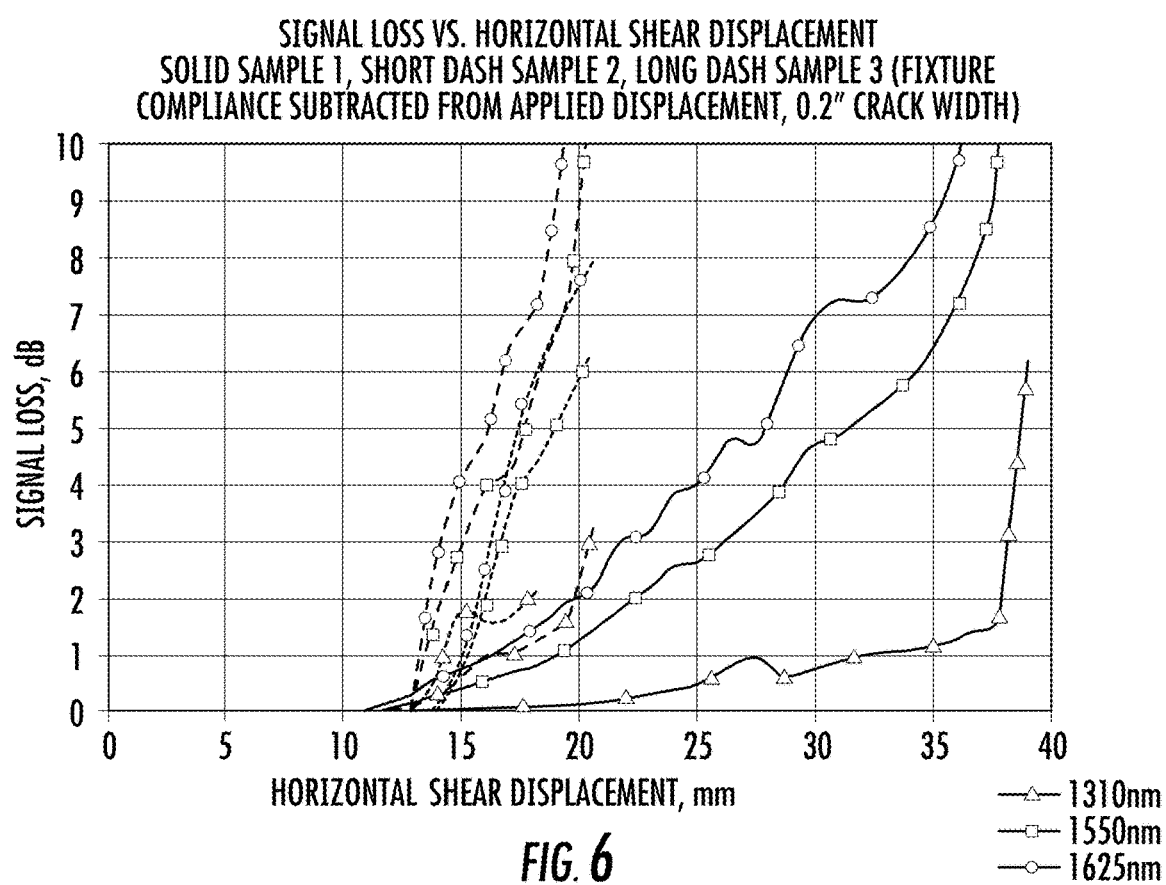
FIG. 6 shows a plot of signal loss vs. horizontal displacement generated from several horizontal shear simulation tests.
Figure 7:
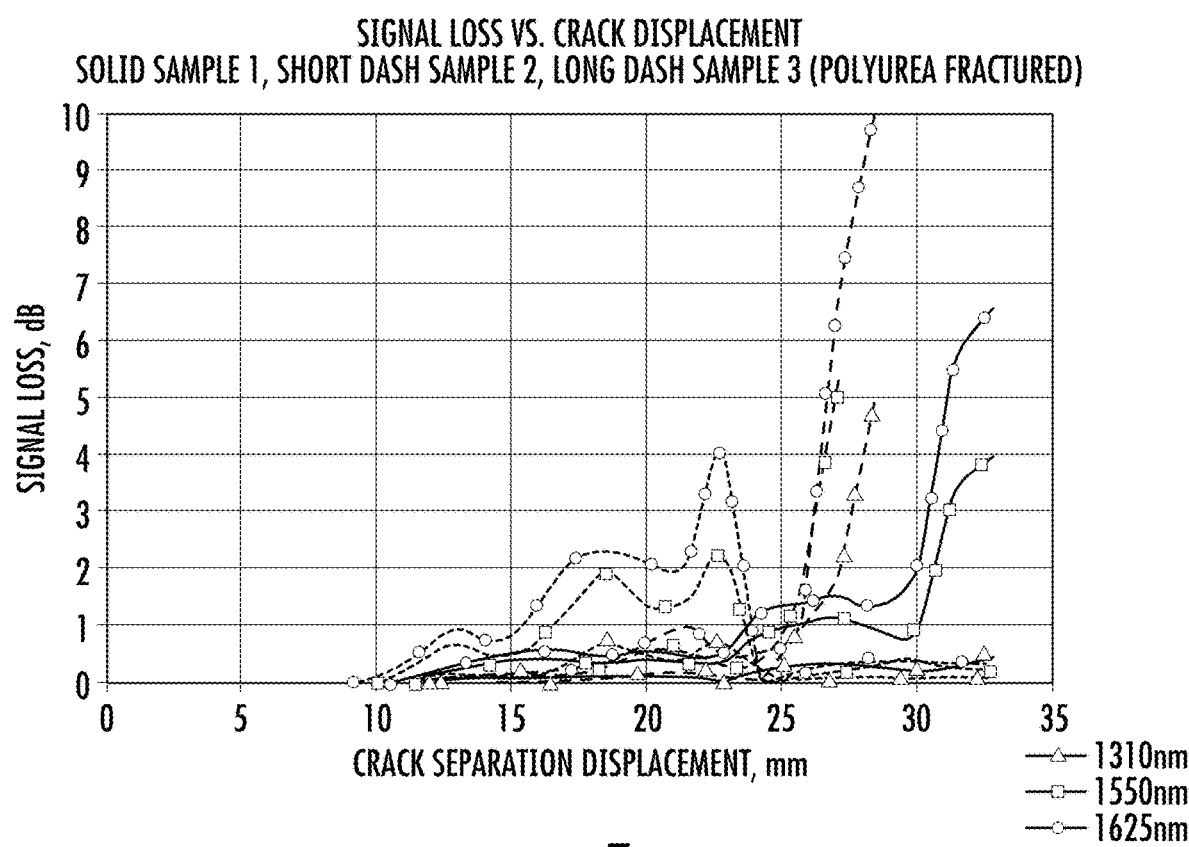
FIG. 7 shows a plot of signal loss vs. crack separation displacement generated from several crack separation simulation tests.

Referring to FIGS. 5-7, several plots of signal loss vs. displacement are shown for several optical cable samples at three different transmission wavelengths. FIGS. 5-7 represent experimental test data representing three types of displacement that an optical cable may experience when embedded in a roadway. As can be seen from FIGS. 5-7, under all three displacement types, signal loss remains below 2 dB when displacement is less than 10 nm, or approximately 0.4 inches. Thus, in one embodiment, the monitoring system and process discussed herein utilizes the strain associated with a total roadway displacement (e.g., aggregate of all roadway defects) of less than 10 mm as the predetermined allowed strain threshold and a total network optical signal attenuation of less than or equal to 2 dB to trigger the need for strain relief. In a specific embodiment, the monitoring system and process discussed herein utilizes the strain associated with a roadway displacement of less than 8 mm, or approximately 0.315 inches, for one or more defects as the predetermined allowed strain threshold to trigger the need for strain relief. It is believed that in such embodiments, the network may be able to include up to 20 defects or more of 8 mm or less before total network attenuation exceeds 2 dB.

In various embodiments, the vertical and horizontal shear limits of a fiber optic cable (such as cables 40 and 60, as shown in FIGS. 5 and 6, respectively) are determined by subjecting test cable samples surrounded by polyurea in a surrogate roadway to increasing shear displacement while monitoring the fiber signal loss. Specifically, FIG. 5 shows the signal loss versus vertical shear displacement for cable 40 in its most strain-sensitive orientation, i.e., where the plane defined by strength members 52 is parallel to the shear displacement direction. Similarly, FIG. 6 shows the signal loss versus horizontal shear displacement for cable 40 in its most sensitive orientation.

As shown in FIG. 7, crack separation limits of the cable are determined by subjecting test cable samples surrounded by polyurea in a surrogate roadway to increasing roadway crack widths while monitoring fiber signal loss. FIG. 7 shows the signal loss versus crack separation displacement to simulate crack width growth which elongates a cable traversing the crack.

The optical fibers discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical transmission elements discussed herein can include a wide variety of optical fibers including multi-mode fibers, single mode fibers, bend insensitive/resistant fibers, etc. In other embodiments, the optical cables discussed herein may include multi-core optical fibers, and in this embodiment, each optical transmission element may be a single, integral optical structure having multiple optical transmission elements (e.g., multiple optical cores surrounded by cladding).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of delivering fiber optic communication service comprising:
    embedding a fiber optic cable within a channel formed within a roadway, the fiber optic cable including a communications optical fiber extending a length of the channel;
    embedding a strain-sensing optical fiber within the channel;
    determining strain experienced by the strain-sensing optical fiber from a strain signal generated by the strain-sensing optical fiber;
    comparing the determined strain to a predetermined allowable strain threshold;
    locating a roadway defect along the fiber optic cable when the determined strain exceeds the predetermined allowable strain threshold; and
    decreasing the strain experienced by the strain-sensing optical fiber and the fiber optic cable by cutting portions of the roadway on both sides of the channel at the location of the roadway defect and patching the cut portions of roadway, wherein a strain experienced by the communications optical fiber relates to the strain experienced by the strain-sensing optical fiber, wherein decreasing the strain experienced by the strain-sensing optical fiber results in a decrease in the strain experienced by the communications optical fiber.

2. The method of claim 1, further comprising measuring a baseline strain of the strain-sensing optical fiber within one week of being embedded within the channel, wherein the predetermined allowable strain threshold is based at least in part on the measured baseline strain.

3. The method of claim 1, further comprising embedding a strain-isolated temperature sensing optical fiber within the channel.

4. The method of claim 3, further comprising determining temperature of the strain-sensing fiber by monitoring a temperature signal generated by the temperature sensing fiber, wherein determining the strain experienced by the strain-sensing fiber is based on both the determined temperature and the strain signal.

5. The method of claim 4, wherein the fiber optic cable includes an outer jacket surrounding the communications optical fiber, wherein the strain-sensing optical fiber and the temperature sensing optical fiber are located within the outer jacket of the fiber optic cable, wherein the communications optical fiber and the strain-sensing optical fiber are mechanically coupled to each other such that the strain experienced by the strain-sensing optical fiber relates to a strain experienced by the communications optical fiber.

6. The method of claim 1, wherein the predetermined allowable strain threshold is the strain associated with a total network optical signal attenuation of less than or equal to 2 dB.

7. The method of claim 6, wherein the predetermined allowable strain threshold is less than a recoverable strain limit of the fiber optic cable.

8. The method of claim 1, wherein cutting portions of the roadway on both sides of the channel includes extending each cut portion a length of at least 1 foot across the roadway defect, wherein the channel is formed in an asphalt or concrete material of the roadway, and the channel further comprises a polymeric material filling the channel and surrounding the fiber optic cable and the strain-sensing fiber.

9. A method of monitoring a roadway-embedded fiber optic cable comprising:
monitoring a strain signal generated by a strain-sensing optical fiber embedded in a roadway;
comparing the strain signal to a predetermined allowable strain threshold of an optical communication cable associated with the strain-sensing optical fiber; and
relieving strain at a position along a length of the optical communications cable when the strain signal is determined to exceed the predetermined allowable strain threshold, wherein relieving the strain comprises cutting portions of the roadway on both sides of the optical communication cable at a roadway defect causing the increased strain, and further comprising patching the cut portions of the roadway after the strain is relieved.

10. The method of claim 9, further comprising determining temperature of the strain-sensing fiber by monitoring a temperature signal generated by a temperature sensing fiber, wherein comparing the strain signal includes calculating an amount of strain experienced by the strain-sensing fiber, wherein calculating the amount of strain is based upon the temperature signal, and wherein both the strain signal and the temperature signal are determined by measuring an optical transmission property of optical signals transmitted along the strain-sensing fiber and the temperature sensing fiber.

11. The method of claim 10, wherein the predetermined allowable strain threshold is the strain associated with a roadway displacement of less than 10 mm.

12. The method of claim 11, wherein the predetermined allowable strain threshold is less than a recoverable strain limit of the optical communication cable.

13. The method of claim 11, wherein the optical transmission property of the optical signals of the strain-sensing fiber and the temperature sensing fiber is Brillouin scattering.

14. The method of claim 9, wherein each of the cut portions has a length of at least 1 foot and extends across the roadway defect.

* * * * *